United States Patent
Shih et al.

(10) Patent No.: US 11,622,305 B2
(45) Date of Patent: *Apr. 4, 2023

(54) METHOD AND APPARATUS FOR PERFORMING CELL (RE)SELECTION IN A WIRELESS COMMUNICATION SYSTEM

(71) Applicant: FG Innovation Company Limited, Tuen Mun (HK)

(72) Inventors: Mei-Ju Shih, Taipei (TW); Chie-Ming Chou, Taipei (TW); Hung-Chen Chen, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 0 days.

This patent is subject to a terminal disclaimer.

(21) Appl. No.: 17/586,079

(22) Filed: Jan. 27, 2022

(65) Prior Publication Data

US 2022/0150779 A1    May 12, 2022

Related U.S. Application Data

(63) Continuation of application No. 16/446,399, filed on Jun. 19, 2019, now Pat. No. 11,272,406.

(60) Provisional application No. 62/688,192, filed on Jun. 21, 2018.

(51) Int. Cl.
*H04W 36/00* (2009.01)
*H04W 36/08* (2009.01)
*H04W 36/32* (2009.01)

(52) U.S. Cl.
CPC . *H04W 36/00835* (2018.08); *H04W 36/0072* (2013.01); *H04W 36/08* (2013.01); *H04W 36/0083* (2013.01); *H04W 36/32* (2013.01)

(58) Field of Classification Search
CPC ............. H04W 36/0072; H04W 36/08; H04W 36/00835; H04W 48/18; H04W 48/14
See application file for complete search history.

(56) References Cited

U.S. PATENT DOCUMENTS

2010/0067375 A1    3/2010  Ianev
2015/0172977 A1*   6/2015  Koc .................. H04W 36/0083
                                                        455/437
(Continued)

FOREIGN PATENT DOCUMENTS

JP   2013031199 A   2/2013
WO   2016114149     7/2016
(Continued)

OTHER PUBLICATIONS

3GPP TSG-RAN2 Meeting #105, R2-19xxxxx, Introduction of late drop NGEN-DC, NE-DC and NR-DC. Athens, Greece, Feb. 25-Mar. 1, 2018. (Year: 2018).*

(Continued)

*Primary Examiner* — Oussama Roudani
(74) *Attorney, Agent, or Firm* — ScienBiziP, P.C.

(57) ABSTRACT

A method of wireless communication is provided. The method includes transmitting an RRC system information request message to a cell; receiving a minimum required received level factor and an offset via system information, the offset being included in at least one of a SIB3 and a SIB4; obtaining a minimum required received level based on the minimum required received level factor and on the offset multiplied by an integer larger than one; determining a cell selection criterion based on the minimum required received level; and performing inter-frequency cell reselection according to the cell selection criterion when the offset is received in first neighboring cell related information for the inter-frequency cell reselection in the SIB4. A user equipment using such method is also provided.

8 Claims, 5 Drawing Sheets

(56) References Cited

U.S. PATENT DOCUMENTS

| | | |
|---|---|---|
| 2015/0327141 A1 | 11/2015 | Jung et al. |
| 2016/0309360 A1 | 10/2016 | Noldus |
| 2018/0139798 A1* | 5/2018 | Jung .................. H04W 76/27 |
| 2018/0249383 A1* | 8/2018 | Martin .............. H04W 36/0061 |
| 2019/0342845 A1* | 11/2019 | Laselva ................ H04L 1/1812 |
| 2020/0275335 A1* | 8/2020 | Wu ....................... H04W 36/08 |

FOREIGN PATENT DOCUMENTS

| | | |
|---|---|---|
| WO | 2016/178440 A1 | 11/2016 |
| WO | 2017/033882 A1 | 3/2017 |
| WO | 2017/071473 A1 | 5/2017 |

OTHER PUBLICATIONS

CMCC, "Open issues on cell selection/reselection rules", R2-1805508, 3GPP TSG-RAN WG2 Meeting #101 bis, Sanya, China, Apr. 16-20, 2018.

MTI, "Clarification on q-RxLevMinSUL Signaling in SIB1", R2-1810525, 3GPP TSG-RAN WG2 AH1807 Meeting, Montreal, Canada, Jul. 2-6, 2018.

Huawei HiSilicon, Cell Selection and Reselection for SUL Cell, 3GPP TSG-RAN WG2#101bis, Sanya, China, Apr. 16-Apr. 20, 2018, R2-1805228.

CATT, Multiple dedicated RACH resources allocation,3GPP TSG-RAN WG2#101 bis, Sanya, China, Apr. 16-Apr. 20, 2018, R2-1804479, the whole document.

Samsung, On the procedures for SUL, 3GPP TSG-RAN WG2 Meeting #100, Reno, USA, Nov. 27-Dec. 1, 2017, R2-1712836, the whole document.

Samsung, On Demand SI: Remaining Issues, 3GPP TSG-RAN2 101, Athens, Greece, Feb. 26-Mar. 2, 2018, R2-1801882, the whole document.

Non-Final office action dated Dec. 21, 2022 for U.S. Appl. No. 17/827,965 which is the family application of the instant application.

\* cited by examiner

METHOD AND APPARATUS FOR PERFORMING CELL (RE)SELECTION IN A WIRELESS COMMUNICATION SYSTEM

CROSS-REFERENCE TO RELATED APPLICATION(S)

The present application is a continuation application of U.S. patent application Ser. No. 16/446,399, filed on Jun. 19, 2019, which claims the benefit of and priority to U.S. Provisional Patent Application Ser. No. 62/688,192, filed on Jun. 21, 2018, the contents of all of which are hereby fully incorporated herein by reference for all purposes.

FIELD

The present disclosure generally relates to wireless communications, and more particularly, to methods and apparatuses for performing cell (re)selection in a wireless communication system.

BACKGROUND

Various efforts have been made to improve different aspects of wireless communications (e.g., data rate, latency, reliability, mobility, etc.) for the next generation (e.g., the fifth generation (5G) New Radio (NR)) wireless communication systems. For example, in the next generation wireless communication systems, the distribution of system information may target for energy efficiency, fast system access, flexible deployment, etc. However, the design of system information content in the information blocks needs to consider the usage of such system information content and how the information blocks are distributed. Furthermore, to achieve the flexibility and energy efficiency, the minimum system information needs to be structured as compact as possible.

SUMMARY

The present disclosure is directed to methods and apparatuses for performing cell (re)selection in a wireless communication system.

According to a first aspect of the present disclosure, a user equipment (UE) for wireless communication is provided. The UE includes one or more non-transitory computer-readable media having computer-executable instructions embodied thereon and at least one processor coupled to the one or more non-transitory computer-readable media. The at least one processor is configured to execute the computer-executable instructions to transmit a Radio Resource Control (RRC) system information request message to a cell; receive a minimum required received level factor and an offset via system information, the offset being included in at least one of a System Information Block 3 (SIB3) and a System Information Block 4 (SIB4); obtain a minimum required received level based on the minimum required received level factor and on the offset multiplied by an integer larger than one; determine a cell selection criterion based on the minimum required received level; and perform inter-frequency cell reselection according to the cell selection criterion when the offset is received in first neighboring cell related information for the inter-frequency cell reselection in the SIB4.

In some implementations of the first aspect of the present disclosure, the at least one processor is further configured to execute the computer-executable instructions to: perform intra-frequency cell reselection when the offset is received in second neighboring cell related information for the intra-frequency cell reselection in the SIB3.

According to a second aspect of the present disclosure, a base station for wireless communication is provided. The base station includes one or more non-transitory computer-readable media having computer-executable instructions embodied thereon and at least one processor coupled to the one or more non-transitory computer-readable media. The at least one processor is configured to execute the computer-executable instructions to receive, from a UE, an RRC system information request message; transmit a minimum required received level factor via system information to the UE; and transmit, in response to the RRC system information request message received from the UE, an offset in first neighboring cell related information for inter-frequency cell reselection in a SIB4.

In some implementations of the second aspect of the present disclosure, the at least one processor is further configured to execute the computer-executable instructions to: transmit the offset in second neighboring cell related information for intra-frequency cell reselection in a SIB3.

According to a third aspect of the present disclosure, a method performed by a UE for wireless communication is provided. The method includes transmitting an RRC system information request message to a cell; receiving a minimum required received level factor and an offset via system information, the offset being included in at least one of a SIB3 and a SIB4; obtaining a minimum required received level based on the minimum required received level factor and on the offset multiplied by an integer larger than one; determining a cell selection criterion based on the minimum required received level; and performing inter-frequency cell reselection according to the cell selection criterion when the offset is received in first neighboring cell related information for the inter-frequency cell reselection in the SIB4.

In some implementations of the third aspect of the present disclosure, the method further includes performing intra-frequency cell reselection when the offset is received in second neighboring cell related information for the intra-frequency cell reselection in the SIB3.

According to a fourth aspect of the present disclosure, a method performed by a base station for wireless communication is provided. The method receiving, from a UE, an RRC system information request message; transmitting a minimum required received level factor via system information to the UE; and transmitting, in response to the RRC system information request message received from the UE, an offset in first neighboring cell related information for inter-frequency cell reselection in a SIB4.

In some implementations of the fourth aspect of the present disclosure, the method further includes transmitting the offset in second neighboring cell related information for intra-frequency cell reselection in a SIB3.

According to a fifth aspect of the present disclosure, a UE is provided. The UE includes one or more non-transitory computer-readable media having computer-executable instructions embodied thereon and at least one processor coupled to the one or more non-transitory computer-readable media. The at least one processor is configured to execute the computer-executable instructions to receive a minimum required received level factor and an offset via system information; obtain a minimum required received level based on the minimum required received level factor and the offset multiplied by an integer larger than one; determine a cell selection criterion based on the minimum required received level; and perform cell reselection based on the cell selection criterion.

According to a sixth aspect of the present disclosure, a base station is provided. The base station includes one or more non-transitory computer-readable media having computer-executable instructions embodied thereon and at least one processor coupled to the one or more non-transitory computer-readable media. The at least one processor is configured to execute the computer-executable instructions to transmit a minimum required received level factor and an offset via system information; wherein the offset is transmitted in response to an RRC system information request message received from a UE.

According to a seventh aspect of the present disclosure, a method of wireless communication is provided. The method includes receiving, by a UE, a minimum required received level factor and an offset via system information; obtaining, by the UE, a minimum required received level based on the minimum required received level factor and the offset multiplied by an integer larger than one; determining, by the UE, a cell selection criterion based on the minimum required received level; and performing, by the UE, cell reselection based on the cell selection criterion.

According to an eighth aspect of the present disclosure, a method of wireless communication is provided. The method includes receiving, by a base station, an RRC system information request message from a UE; transmitting, by the base station, a minimum required received level factor and an offset via system information; wherein the offset is transmitted in response to the RRC system information request message received from the UE.

BRIEF DESCRIPTION OF THE DRAWINGS

Aspects of the present disclosure are best understood from the following detailed description when read with the accompanying figures. Various features are not drawn to scale. Dimensions of various features may be arbitrarily increased or reduced for clarity of discussion.

DETAILED DESCRIPTION

Figure 1:
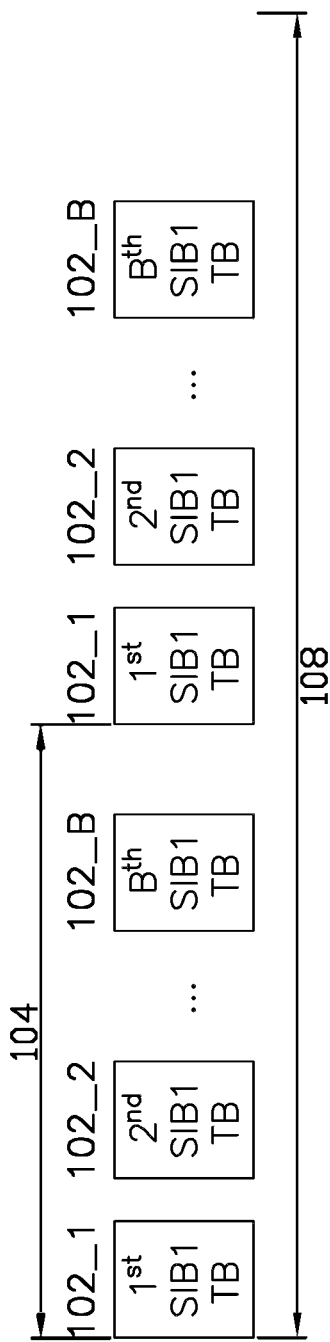
FIG. 1 is a schematic diagram illustrating a split of System Information Block Type 1 (SIB1) content, in accordance with example implementations of the present disclosure.

The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

For the purpose of consistency and ease of understanding, like features are identified (although, in some examples, not shown) by numerals in the example figures. However, the features in different implementations may be differed in other respects, and thus shall not be narrowly confined to what is shown in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent. The expression "at least one of A, B and C" or "at least one of the following: A, B and C" means "only A, or only B, or only C, or any combination of A, B and C."

Additionally, for the purposes of explanation and non-limitation, specific details, such as functional entities, techniques, protocols, standard, and the like are set forth for providing an understanding of the described technology. In other examples, detailed description of well-known methods, technologies, systems, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules which may be software, hardware, firmware, or any combination thereof. The software implementation may comprise computer-executable instructions stored on computer-readable medium such as memory or other type of storage devices. For example, one or more microprocessors or general-purpose computers with communication processing capability may be programmed with corresponding executable instructions and carry out the described network function(s) or algorithm(s). The microprocessors or general-purpose computers may be formed of Application-Specific Integrated Circuitry (ASIC), programmable logic arrays, and/or using one or more Digital Signal Processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer-readable medium includes but is not limited to Random Access Memory (RAM), Read-Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long Term Evolution (LTE) system, an LTE-Advanced (LTE-A) system, an LTE-Advanced Pro system, or a 5G NR Radio Access Network (RAN)) typically includes at least one base station, at least one UE, and one or more optional network elements that provide connection towards a network. The UE communicates with the network (e.g., a Core Network (CN), an Evolved Packet Core (EPC) network, an Evolved Universal Terrestrial Radio Access network (E-UTRAN), a Next-Generation Core (NGC), a 5G Core (5GC), or an internet), through a RAN established by one or more base stations.

It should be noted that, in the present application, a UE may include, but is not limited to, a mobile station, a mobile terminal or device, or a user communication radio terminal. For example, a UE may be a portable radio equipment, which includes, but is not limited to, a mobile phone, a tablet, a wearable device, a sensor, a vehicle, or a Personal Digital Assistant (PDA) with wireless communication capability. The UE is configured to receive and transmit signals over an air interface to one or more cells in a radio access network.

A base station may be configured to provide communication services according to at least one of the following Radio Access Technologies (RATs): Worldwide Interoperability for Microwave Access (WiMAX), Global System for Mobile communications (GSM, often referred to as 2G), GSM Enhanced Data rates for GSM Evolution (EDGE) Radio Access Network (GERAN), General Packet Radio Service (GPRS), Universal Mobile Telecommunication System (UMTS, often referred to as 3G) based on basic wideband-code division multiple access (W-CDMA), high-speed packet access (HSPA), LTE, LTE-A, eLTE (evolved LTE, e.g., LTE connected to 5GC), NR (often referred to as 5G), and/or LTE-A Pro. However, the scope of the present application should not be limited to the above-mentioned protocols.

A base station may include, but is not limited to, a node B (NB) as in the UNITS, an evolved node B (eNB) as in the LTE or LTE-A, a radio network controller (RNC) as in the UMTS, a base station controller (BSC) as in the GSM/GERAN, a ng-eNB as in an E-UTRA base station in connection with the 5GC, a next generation Node B (gNB) as in the 5G-RAN, and any other apparatus capable of controlling radio communication and managing radio resources within a cell. The base station may connect to serve the one or more UEs through a radio interface to the network.

The base station is operable to provide radio coverage to a specific geographical area using a plurality of cells forming the radio access network. The base station supports the operations of the cells. Each cell is operable to provide services to at least one UE within its radio coverage. More specifically, each cell (often referred to as a serving cell) provides services to serve one or more UEs within its radio coverage (e.g., each cell schedules the downlink and optionally uplink resources to at least one UE within its radio coverage for downlink and optionally uplink packet transmissions). The base station can communicate with one or more UEs in the radio communication system through the plurality of cells. A cell may allocate sidelink (SL) resources for supporting Proximity Service (ProSe) or Vehicle to Everything (V2X) service. Each cell may have overlapped coverage areas with other cells.

As discussed above, the frame structure for NR is to support flexible configurations for accommodating various next generation (e.g., 5G) communication requirements, such as Enhanced Mobile Broadband (eMBB), Massive Machine Type Communication (mMTC), Ultra-Reliable and Low-Latency Communication (URLLC), while fulfilling high reliability, high data rate and low latency requirements. The Orthogonal Frequency-Division Multiplexing (OFDM) technology as agreed in 3rd Generation Partnership Project (3GPP) may serve as a baseline for NR waveform. The scalable OFDM numerology, such as the adaptive sub-carrier spacing, the channel bandwidth, and the Cyclic Prefix (CP) may also be used. Additionally, two coding schemes are considered for NR: (1) Low-Density Parity-Check (LDPC) code and (2) Polar Code. The coding scheme adaption may be configured based on the channel conditions and/or the service applications.

Moreover, it is also considered that in a transmission time interval TX of a single NR frame, a downlink (DL) transmission data, a guard period, and an uplink (UL) transmission data should at least be included, where the respective portions of the DL transmission data, the guard period, the UL transmission data should also be configurable, for example, based on the network dynamics of NR. In addition, sidelink resources may also be provided in an NR frame to support ProSe services or V2X services.

In addition, the terms "system" and "network" herein may be used interchangeably. The term "and/or" herein is only an association relationship for describing associated objects, and represents that three relationships may exist. For example, A and/or B may indicate that: A exists alone, A and B exist at the same time, and B exists alone. In addition, the character "/" herein generally represents that the former and latter associated objects are in an "or" relationship.

In general, system information may be transmitted in a Master Information Block (MIB) and one or more System Information Blocks (SIBs). System information may include cell access information, radio resource configuration, synchronization signal, cell specific information, frequency specific information, system wide information, Public Warning System (PWS) information, etc.

In an LTE system, system information may be broadcast periodically. Based on well-defined information in the MIB and SIBs, a UE may receive the system information necessary for accessing a cell. Once the UE powers on and reads the MIB, the UE may synchronize to the cell. Furthermore, if the UE camps on the cell, the UE may read more system information from the cell and perform an RRC connection setup procedure and data transmission. The system information may be broadcast repeatedly by the base station (e.g., an LTE eNB or an LTE cell). The periodicities of the MIB and SIBs may be defined and not necessarily be the same.

In the next generation (e.g., 5G NR) RAN, the distribution of system information may become more flexible and different from that in an LTE network. For example, the system information included in the MIB and SIBs may be different from that in the LTE system. The distribution of system information may be broadcast periodically by a base station (e.g., an NR gNB or an NR cell) or requested on demand by the UE. The base station may broadcast or transmit via dedicated signaling (e.g., via an RRC message) the system information requested by the UE. In some implementations, the minimum system information, including the MIB and the SIB1, may be broadcast periodically. The SIB1 may also be known as the Remaining Minimum System Information (RMSI), while the remaining SIBs, either broadcast on demand or unicast on demand, may be referred to as the other system information (e.g., other SI).

In the next generation (e.g., 5G NR) RAN, the minimum system information may be structured as compact as possible. For example, the size of SIB1 may be restricted to a Transport Block (TB) size of roughly 3000 bits, considering the limitation of the Physical Downlink Shared Channel (PDSCH) carrying the RMSI. With more innovative features (e.g., beams, higher frequency, Supplementary Uplink (SUL), network sharing with at most 12 Public Land Mobile Networks (PLMNs), etc.) in the next generation RAN, it is observed that the size of the SIB1 could increase significantly if without proper restrictions. Thus, in some implementations of the present disclosure, the system information content may be modified in order to reduce the size of the SIB1.

In some implementations of the present disclosure, when a UE receives a SIB1 broadcast by a cell, the UE may store the SIB1, and apply the essential system information contained in the SIB1 to camp on, access and/or connect to the cell. In some implementations of the present disclosure, the UE may apply cell selection related information in the SIB1 to determine whether a cell supports the PLMN selected by the UE. In some implementations, the UE may apply unified access barring related information to determine whether the UE is barred or accepted by a cell. If the UE is barred, its access attempt may fail. If the UE is accepted, its access attempt may succeed. In some implementations, the UE may apply a common serving cell configuration to configure the setting for a cell. In some implementations, the UE may apply a few of the UE timers and/or constants in the SIB1 for a cell. In some implementations, the UE may apply system information scheduling related information to request other SIB(s) from a cell. As the next generation RAN becomes increasingly flexible and functional, more and more system parameters are required. However, since the SIB1 size is limited due to the TB size, further consideration is needed on how to signal the required system information in the SIB1. Thus, some implementations of the present disclosure may provide a signaling mechanism for cell selection information and/or UE timers and constants. In some implementations of the present disclosure, the mechanisms for SIB1 transmission/reception are introduced.

In some implementations of the present disclosure, the SIB1 may be transmitted by a base station or cell on a transport channel (e.g., a Downlink Shared Channel (DL-SCH)). In some implementations, the SIB1 content may be split, by the base station or cell, into at least two Transport Blocks (TBs) to comply with Transport Block Size (TBS) restrictions.

FIG. 1 is a schematic diagram illustrating a split of SIB1 content, in accordance with example implementations of the present disclosure. As illustrated in FIG. 1, the SIB1 content is split into a number (e.g., "B" being an integer) of SIB1 TBs 102_1 to 102_B, by the base station or cell, within a SIB1 transmission period 104.

In some implementations, the SIB1 TBs 102_1 to 102_B may only carry the SIB1 content. In some other implementations, the SIB1 TBs 102_1 to 102_B may carry the mixture of at least one of the SIB1 content, the control information (e.g., Downlink Control Information (DCI), Medium Access Control (MAC) Control Element (CE)) and the data. For example, one SIB1 TB may carry the SIB1 content and the control information, and another SIB1 TB may carry the SIB1 content and the data. For example, only the last SIB1 TB (e.g., the SIB1 TB 102_B) in the SIB1 transmission period (e.g., the SIB1 transmission period 104) or the SIB1 repetition period (e.g., a SIB1 repetition period 108) may carry the control information or the data.

In some implementations of the present disclosure, the SIB1 TBs 102_1 to 102_B may be consecutive in time domain. In some other implementations, the SIB1 TBs 102_1 to 102_B may not be consecutive in time domain. In some implementations, if the SIB1 TBs 102_1 to 102_B are not consecutive, the gap between two of the SIB1 TBs 102_1 to 102_B (e.g., the gap between two neighbor SIB1 TBs) may be pre-configured, or signaled by at least one of the following items: the previous SIB1 TB(s), the MIB, and the Control Resource Set (CORESET) of SIB1. In some implementations, the MIB (or the SIB1 or the CORESET of SIB1) may indicate the gap between two SIB1 TBs, and the gap between two SIB1 TBs may be applied to at least the SIB1 TB(s) transmitted before the next MIB. In some other implementations, the gap between two SIB1 TBs may be applied to the SIB1 TBs within a SIB1 repetition period (e.g., the SIB1 repetition period 108 shown in FIG. 1). In the SIB1 repetition period, the SIB1 content may not be changed and the SIB1 transmission may be repetitive within every SIB1 transmission period (e.g., the SIB1 transmission period 104 shown in FIG. 1).

In some implementations of the present disclosure, one SIB1 TB may signal the gap between itself and the upcoming SIB1 TB(s). These SIB1 TBs may belong to the same transport channel (e.g., DL-SCH). For example, if the SIB1 content is split/distributed into B SIB1 TBs (e.g., the SIB1 TBs 102_1 to 102_B shown in FIG. 1) by the base station or cell, the UE may monitor the B SIB1 TBs to receive all of the SIB1 content.

In some implementations of the present disclosure, the cell may include at least one bit in a SIB1 TB or in a MIB to indicate that the remaining SIB1 content will come in the following TB(s). In some other implementations, the cell may include at least one bit in a SIB1 TB to indicate that this SIB1 TB is the last one for carrying the entire SIB1 content.

In some implementations of the present disclosure, where the SIB1 is split into several SIB1 TBs, the SIB1 transmission period (e.g., the SIB1 transmission period 104 shown in FIG. 1) may be referred to as the time duration from the beginning of the first SIB1 TB of these SIB1 TBs to the end of the last SIB1 TB of these SIB1 TBs. The repetition of these SIB1 TBs (e.g., the SIB1 TBs 102_1 to 102_B in the SIB1 transmission period 104 shown in FIG. 1) may be made within the SIB1 repetition period (e.g., the SIB1 repetition period 108 shown in FIG. 1). In some implementations, the length of the SIB1 repetition period may be, but not limited to, 160 ms.

In some implementations of the present disclosure, the UE may monitor and receive all SIB1 TBs (e.g., the SIB1 TBs 102_1 to 102_B) in the SIB1 repetition period (e.g., the SIB1 repetition period 108). In some other implementations, the UE may monitor, receive and decode the required SIB1 TBs to construct the complete SIB1 content. For example, if the UE has successfully monitored, received and decoded the first B SIB1 TBs in the SIB1 repetition period, the UE may skip monitoring (or receiving) the remaining SIB1 TBs in this SIB1 repetition period. In some other implementations, the UE may monitor the required SIB1 TBs to construct the required content. For example, if the UE has successfully monitored, received and decoded certain SIB1 TB(s) and constructed the required SIB1 content (e.g., the cell selection information) in the SIB1 repetition period, the UE may skip monitoring (or receiving) the remaining SIB1 TB(s) in this SIB1 repetition period.

In some implementations of the present disclosure, the MIB may indicate at least one of the following parameters:
1) the value B (e.g., the number of SIB1 TBs in a SIB1 transmission period),
2) the SIB1 repetition period, and
3) the SIB1 transmission period.

In some other implementations, the MIB may carry at least one of the above-mentioned parameters (e.g., the value B, the SIB1 repetition period, and the SIB1 transmission period).

In some other implementations, the MIB may indicate the resources (e.g., CORESET, Physical Downlink Control Channel (PDCCH), or PDSCH) for carrying at least one of the above-mentioned parameters (e.g., the value B, the SIB1 repetition period, and the SIB1 transmission period).

In some other implementations, each SIB1 TB may indicate a SIB1 transmission period. For example, each SIB1 TB may carry the indication(s) of at least one of the SIB1 transmission period, the value B, and the SIB1 repetition period. For example, each SIB1 TB may indicate the resources (e.g., CORESET or PDCCH) to carry the indication(s) of at least one of the SIB1 transmission period, the value B, and the SIB1 repetition period.

In some other implementations, the first SIB1 TB (e.g., the SIB1 TB 102_1 shown in FIG. 1) in the SIB1 transmission period may indicate at least one of the SIB1 transmission period, the value B, and the SIB1 repetition period. For example, the first SIB1 TB in a SIB1 transmission period may carry the indication(s) of at least one of the SIB1 transmission period, the value B, and the SIB1 repetition period. For example, the first SIB1 TB in a SIB1 transmission period may indicate the resources (e.g., CORESET or PDCCH) to carry the indication(s) of at least one of the SIB1 transmission period, the value B, and the SIB1 repetition period.

In some other implementations, the first SIB1 TB in a SIB1 repetition period may indicate at least one of the SIB1 transmission period, the value B, and the SIB1 repetition period. For example, the first SIB1 TB in a SIB1 repetition period may carry the indication(s) of at least one of the SIB1 transmission period, the value B, and the SIB1 repetition period. For example, the first SIB1 TB in a SIB1 repetition period may indicate the resources (e.g., CORESET or PDCCH) to carry the indication(s) of at least one of the SIB1 transmission period, the value B, and the SIB1 repetition period.

In some implementations of the present disclosure, all SIB1 TBs may apply the same CORESET configuration which is indicated by the MIB. After receiving the CORESET configuration indicated by the MIB, the UE may monitor the SIB1 TBs. The CORESET configuration indicated by the MIB may provide the resource allocation of all B SIB1 TBs. In some implementations, the #n SIB1 TB may indicate the CORESET for the #n+1 SIB1 TB. After receiving the CORESET configuration indicated in the #n SIB1 TB, the UE may monitor the #n+1 SIB1 TB. The CORESET configuration indicated by the #n SIB1 TB may provide the resource allocation of the #n+1 SIB1 TB.

Cell Selection Information

In some implementations of the present disclosure, the SIB1 may include the system information indicating the parameters for cell (re)selection. In some implementations, such cell selection information may be carried in an Information Element (IE) (e.g., cellSelectionInfo IE). Upon receiving the SIB1 from a cell, a UE which is operated in the RRC_IDLE, RRC_INACTIVE, or RRC_CONNECTED state may store the received SIB1. The UE may read the cell selection information from the SIB1 broadcast by the base station or cell, and determine whether to select the cell to camp on/access based on certain rules and/or criteria (e.g., the cell selection criterion S).

In some implementations of the present disclosure, a UE may perform cell selection when the UE powers on or moves out of the cell coverage. The UE may perform initial cell selection without prior knowledge of which Radio Frequency (RF) channels are Radio Access Technology (RAT) frequencies (e.g., LTE frequencies, NR frequencies). The UE may perform cell selection by leveraging stored information. Cell selection may refer to a process in which the UE may search for a suitable cell from which the UE is able to receive communication services. In some implementations, a cell may be deemed as a suitable cell if this cell meets one or more cell selection criteria (e.g., the cell selection criterion S). A cell may be deemed as a suitable cell if this cell is part of either the selected PLMN of the UE or the registered PLMN of the UE or PLMN of the Equivalent PLMN list of the UE, and tracking area code (TAC) is provided by the cell for that PLMN. If the suitable cell is found, the UE may camp on and/or access this cell. Additionally, in some implementations, cell reselection may refer to a process which allows the UE to camp on the best or a better cell when the channel conditions change. For example, while the UE camps on a serving cell, the UE may regularly search for a better cell(s) according to the cell reselection criteria. If a better cell is found, the UE may (re)select the better cell as a new serving cell and camp on and/or access this cell.

In some implementations of the present disclosure, if the cell selection criterion S is fulfilled, the selected cell may match the condition that both of the cell selection received (RX) level value (dB) (e.g., Srxlev) and the cell selection quality value (dB) (e.g., Squal) are positive.

In some implementations, the cell selection RX level value (dB) (e.g., Srxlev) may be equal to, but not limited to, "the measured cell RX level value (e.g., the Reference Signal Received Power (RSRP), $Q_{rxlevmeas}$)" minus "the minimum required RX level in the cell (dBm) (e.g., $Q_{rxlevmin}$)" minus "an offset to the signaled $Q_{rxlevmin}$ taken into account in the Srxlev evaluation as a result of a periodic search for a higher priority PLMN while the UE camps on a cell normally in a Virtual PLMN (VPLMN) (e.g., $Q_{rxlevminoffset}$)" minus "a power compensation value (e.g., $P_{compensation}$)" minus "an offset temporarily applied to a cell (e.g., $Qoffset_{temp}$)", as shown in Equation (1) below.

On the other hand, the cell selection quality value (Squal) may be equal to, but not limited to, "the measured cell quality value (e.g., Reference Signal Received Quality (RSRQ) or $Q_{qualmeas}$)" minus "the minimum required quality level in the cell (dB) (e.g., $Q_{qualmin}$)" minus "an offset to the signaled $Q_{qualmin}$ taken into account in the Squal evaluation as a result of a periodic search for a higher priority PLMN while the UE camps on a cell normally in a VPLMN (e.g., $Q_{qualminoffset}$)" minus "an offset temporarily applied to a cell (e.g., $Qoffset_{temp}$)"), as shown in Equation (2) below.

In some implementations of the present disclosure, the parameters required to calculate the cell selection RX level value and the cell selection quality value (e.g., as shown in Table 1) may be either preconfigured to the UE or broadcast by the base station or cell in SIB1 to the UE. It is possible that some parameters are preconfigured to the UE, some parameters are determined based on UE's implementation, and some parameters are broadcast by the base station or cell in the SIB1 to the UE. In some implementations, it is possible that the UE may store and use some parameters broadcast or unicast from a different base station or cell. For example, the signaled values $Q_{rxlevminoffset}$ and $Q_{qualminoffset}$ may be only applied when a cell is evaluated for cell selection as a result of a periodic search for a higher priority PLMN while the UE camps on a cell normally in a VPLMN. During the periodic search for a higher priority PLMN, the UE may check the cell selection criterion S of a cell using parameter values obtained from a different cell of the higher priority PLMN.

In some implementations, the detailed formula and parameters of the cell selection criterion S may be shown as follows and in Table 1.

$$Srxlev = Q_{rxlevmeas} - (Q_{rxlevmin} + Q_{rxlevminoffset}) - P_{compensation} - Qoffset_{temp} \quad \text{Equation (1)}$$

$$Squal = Q_{qualmeas} - (Q_{qualmin} + Q_{qualminoffset}) - Qoffset_{temp} \quad \text{Equation (2)}$$

where:

TABLE 1

Parameters in Cell Selection Criterion S

| | |
|---|---|
| Srxlev | Cell selection RX level value (dB) |
| Squal | Cell selection quality value (dB) |
| $Qoffset_{temp}$ | Offset temporarily applied to a cell (dB) |
| $Q_{rxlevmeas}$ | Measured cell RX level value (e.g., RSRP) |
| $Q_{qualmeas}$ | Measured cell quality value (e.g., RSRQ) |
| $Q_{rxlevmin}$ | Minimum required RX level in the cell (dBm). If the UE supports SUL frequency for this cell, $Q_{rxlevmin}$ may be obtained from q-RxLevMin-sul, if present, in SIB1, else $Q_{rxlevmin}$ is obtained from q-RxLevMin in SIB1 |
| $Q_{qualmin}$ | Minimum required quality level in the cell (dB) |
| $Q_{rxlevminoffset}$ | Offset to the signaled $Q_{rxlevmin}$ taken into account in the Srxlev evaluation as a result of a periodic search for a higher priority PLMN while the UE camps on a cell normally in a VPLMN |
| $Q_{qualminoffset}$ | Offset to the signaled $Q_{qualmin}$ taken into account in the Squal evaluation as a result of a periodic search for a higher priority PLMN while the UE camps on a cell normally in a VPLMN |
| $P_{compensation}$ | If the UE supports the additionalPmax in the NS-PmaxList, if present, in SIB1:<br>$\max(P_{EMAX1} - P_{PowerClass}, 0) - (\min(P_{EMAX2}, P_{PowerClass}) - \min(P_{EMAX1}, P_{PowerClass}))$ (dB);<br>else:<br>$\max(P_{EMAX1} - P_{PowerClass}, 0)$ (dB) |

In Table 1, the NS-PmaxList may include a list of additional Pmax values and additional spectrum emission values, where the Pmax values may be used to limit the UE's UL transmission power on a carrier frequency. The $P_{PowerClass}$ may be the maximum UE output power for the transmission bandwidth, where the $P_{PowerClass}$ may or may not consider any tolerance. The $P_{EMAX1}$ and the $P_{EMAX2}$ may be power values. In some implementations, the NS-PmaxList, the $P_{PowerClass}$, the $P_{EMAX1}$ and the $P_{EMAX2}$ may be signaled by the SIB1, other system information (e.g., including SIB(s) other than the SIB1), or RRC signaling.

It should be noted that the cell selection criterion (e.g., the cell selection criterion S) described herein is only for illustrative purposes, and not intended to limit the scope of the present invention. The description of the cell selection criterion may suggest many variations and alternatives. For example, one or more parameters may be introduced in/removed from the formula of the Srxlev and/or the Squal shown above, as long as that the cell selection criterion can be directly or indirectly derived from the minimum required RX level (e.g., the $Q_{rxlevmin}$).

In some implementations of the present disclosure, the UE may receive a minimum required received level factor (e.g., the q-RxLevMin) via system information transmitted by the base station or the cell. In some of such implementations, the q-RxLevMin-sul may be in the form of an offset to the minimum required received level factor (e.g., the q-RxLevMin). Such offset may be presented in the SIB3 and/or the SIB4 transmitted by the base station or the cell. The UE may obtain a minimum required received level (e.g., the $Q_{rxlevmin}$) based on the minimum required received level factor (e.g., the q-RxLevMin) and the offset multiplied by Y (e.g., Y×q-RxLevMin-sul), where Y is an integer. In some of such implementations, Y may be an integer larger than one. The UE may then determine the cell selection criterion S based on the $Q_{rxlevmin}$, and perform cell reselection based on the cell selection criterion S.

In some other implementations of the present disclosure, the q-RxLevMin-sul may be in the form of an absolute value. In some of such implementations, the UE may obtain the minimum required received level (e.g., the $Q_{rxlevmin}$) based on either the q-RxLevMin-sul (e.g., in the form of an absolute value) or the q-RxLevMin.

It should be noted that the q-RxLevMin-sul described herein may be in the form of an offset or in the form of an absolute value unless otherwise indicated.

In some other implementations, if the UE supports SUL frequency for a cell and/or if the q-RxLevMin-sul is broadcast in the SIB1 by the base station or cell, the UE may calculate the $Q_{rxlevmin}$ obtained from the q-RxLevMin-sul broadcast by the base station or cell.

In some other implementations, if the UE supports SUL frequency for a cell and if the q-RxLevMin-sul is not broadcast in SIB1 by the base station or cell, the UE may calculate the $Q_{rxlevmin}$ obtained from a stored q-RxLevMin-sul. The stored q-RxLevMin-sul may be acquired from other base stations or cells. For example, the stored q-RxLevMin-sul may be acquired from another cell which the UE selected or camped on before. For example, the stored q-RxLevMin-sul may be acquired from neighboring cell(s). In some implementations, the neighboring cells may be the cells for which the UE has a positive cell selection RX level value and a positive cell selection quality value. In some implementations, the UE may adopt the q-RxLevMin-sul from one cell satisfying the cell selection criterion S when the UE evaluates the cell selection criterion S of another cell which may not broadcast/transmit the q-RxLevMin-sul in the SIB1. In some implementations, the q-RxLevMin-sul may be broadcast or unicast by the neighboring cells.

In some implementations of the present disclosure, if the UE stores more than one q-RxLevMin-sul value, it may be up to the UE's implementation to select one of the stored q-RxLevMin-sul values as the q-RxLevMin-sul to calculate the $Q_{rxlevmin}$. In some other implementations, if the UE has more than one stored q-RxLevMin-sul value, the UE may use the lowest or the highest q-RxLevMin-sul value among the stored q-RxLevMin-sul values as the q-RxLevMin-sul to calculate the $Q_{rxlevmin}$. In some other implementations, if the UE acquires or stores more than one q-RxLevMin-sul value, the UE may use the average of the acquired or stored q-RxLevMin-sul values as the q-RxLevMin-sul to calculate the $Q_{rxlevmin}$. It should be noted that in some aspects, when the UE evaluates the cell selection criterion S for a cell (which may not broadcast the q-RxLevMin-sul and the q-RxLevMin), the mechanism(s) of how the UE applies the q-RxLevMin-sul (e.g., based on acquired q-RxLevMin-sul values, based on stored q-RxLevMin-sul values, based on the q-RxLevMin-sul from neighboring cell(s)) may also be applied in the cell selection criterion evaluation process.

In some implementations of the present disclosure, if the UE does not store the q-RxLevMin-sul value(s) and may not acquire the q-RxLevMin-sul value(s) from any cell (e.g., serving cells, camped cells, neighboring cells), the UE may use a default q-RxLevMin-sul value. In some implementations, the default q-RxLevMin-sul value may be preconfigured or predefined. In some implementations, the default q-RxLevMin-sul value may be the q-RxLevMin value for a normal UL carrier. The q-RxLevMin value may be a minimum required RX level in the cell (dBm) on a normal UL carrier. In some implementations, compared to the SUL carrier, the coverage of a normal UL carrier may be smaller. In some implementations, compared to the SUL carrier, the frequency of a normal UL carrier is higher than that of the SUL carrier.

In some implementations of the present disclosure, if the UE supports SUL frequency for a cell and/or if the q-RxLevMin-sul is not broadcast in the SIB1 by this cell, the UE may calculate the a first $Q_{rxlevmin}$ according to the q-RxLevMin for the normal UL carrier, determine a first cell selection criterion S based on the first $Q_{rxlevmin}$, and perform cell selection based on the first cell selection criterion S.

Once the UE selects such cell during the cell selection, the UE may further send an RRC message (e.g., an RRC system information request message) to the cell and ask for the q-RxLevMin-sul. The q-RxLevMin-sul may be cell-specific. The UE may use the q-RxLevMin-sul value for intra-frequency cell reselection, inter-frequency cell reselection, and inter-RAT cell reselection. In some implementations, an intra-frequency cell reselection procedure may refer to a process in which the UE may select another cell on the same frequency as that of the serving cell. In some implementations, an inter-frequency cell reselection may refer to a process in which the UE may select another cell on a frequency different from the frequency of the serving cell. In some implementations, an inter-RAT frequency procedure may refer to a process in which the UE may perform cell reselection to a neighboring cell that belongs to a RAT different from the serving cell. A cell in an inter-RAT frequency may be referred to as an inter-RAT cell.

Once the UE acquires the q-RxLevMin-sul, the UE may calculate a second $Q_{rxlevmin}$ according to the q-RxLevMin-sul, determine a second cell selection criterion S based on the second $Q_{rxlevmin}$, and perform cell (re)selection (e.g., intra-frequency cell reselection, inter-frequency cell reselection, or inter-RAT cell reselection) based on the second cell selection criterion S.

In some implementations of the present disclosure, the base station (or the cell) may transmit the q-RxLevMin to the UE in the SIB1, and further transmit an SUL related factor (e.g., the q-RxLevMin-sul in the form of an absolute value) in other system information in respond to receiving the RRC system information request message from the UE.

The reason that a cell does not include the q-RxLevMin-sul in the SIB1 may be to reduce the SIB1 size, though the cell supports the SUL. However, if the UE requests the q-RxLevMin-sul from a cell via an RRC message (e.g., an RRC system information request message) and successfully acquires the q-RxLevMin-sul from the cell, the UE may use the SUL of the cell when the cell selection criterion S is fulfilled by considering the q-RxLevMin-sul. In some implementations, if the cell provides the q-RxLevMin-sul in other system information (e.g., including SIB(s) other than the SIB1) or an RRC message (e.g., RRC reconfiguration message), it means that the cell may ask the UE to switch to the SUL carrier. For example, upon receiving the q-RxLevMin-sul via other system information or via an RRC message, the UE may switch to the SUL carrier of the cell. In another example, upon receiving the q-RxLevMin-sul via other system information or via an RRC message, the UE may perform cell selection criterion S evaluation for the SUL carrier. If the cell selection criterion S is fulfilled, the UE may switch to the SUL carrier. The reason may be for the purpose of normal UL carrier offloading. In some other implementations, if the cell does not broadcast the q-RxLevMin in the SIB1, the UE may request the q-RxLevMin from the base station or the cell via an RRC message (e.g., an RRC system information request message).

If the UE successfully acquires the q-RxLevMin from the cell, and the cell selection criterion S by calculating the q-RxLevMin value is fulfilled, the UE may switch to a normal UL carrier. In some other implementations, if the cell provides the q-RxLevMin in other system information (e.g., including SIB(s) other than the SIB1) or an RRC message (e.g., RRC reconfiguration message), it means that the cell asks the UE to switch to a normal UL carrier. If the q-RxLevMin matches the cell selection criterion S, the UE may switch to the normal UL carrier. For example, upon receiving the q-RxLevMin via other system information or via an RRC message, the UE may switch to the normal UL carrier of the cell. In another example, upon receiving the q-RxLevMin via other system information or via an RRC message, the UE may perform cell selection criterion S evaluation for the normal UL carrier. If the cell selection criterion S is fulfilled, the UE may switch to the normal UL carrier.

The field to indicate the q-RxLevMin in the SIB1 may require several bits. The number of the bits may depend on the possible range of the q-RxLevMin value. For example, the q-RxLevMin value may be an integer with a value ranging from −70 to −22 (dBm). In some implementations, it is possible that the q-RxLevMin-sul value may fall in the same range as the q-RxLevMin value. In some implementations, to reduce the SIB1 size, the q-RxLevMin-sul value may be further reduced. In some implementations, if the q-RxLevMin and the q-RxLevMin-sul have the same value, the cell may broadcast the q-RxLevMin (or the q-RxLevMin-sul) and a specific indicator (e.g., a one-bit indicator) to indicate that the q-RxLevMin and the q-RxLevMin-sul have the same value. For example, if the specific indicator is set to "TRUE" or present in the SIB1, the UE may know that the values of the q-RxLevMin and the q-RxLevMin-sul are the same, and the UE may not further request the q-RxLevMin or the q-RxLevMin-sul from a cell/base station.

In some implementations of the present disclosure, the value of q-RxLevMin-sul may be in the form of an offset to the q-RxLevMin value. For example, the expression "q-RxLevMin minus q-RxLevMin-sul" (in dBm) may represent the minimum required RX level for SUL in the cell. For example, the expression "q-RxLevMin minus q-RxLevMin-sul" (in dBm) may represent the minimum required RX level for the normal UL carrier in the cell. In some implementations, the value of q-RxLevMin-sul may be 0, 1, 2, . . . , X, where X may decide the bit number of the q-RxLevMin-sul. In some other implementations, the value of q-RxLevMin-sul may be 0, −1, −2, . . . , −X, and the expression "q-RxLevMin plus q-RxLevMin-sul" (in dBm) may represent the minimum required RX level for SUL in the cell. In some other implementations, the value of q-RxLevMin-sul may be 0, −1, −2, . . . , −X, and the expression "q-RxLevMin plus q-RxLevMin-sul" (in dBm) may represent the minimum required RX level for the normal UL carrier in the cell.

In some implementations of the present disclosure, to further reduce the SIB1 size, the expression "q-RxLevMin minus/plus "Y times q-RxLevMin-sul"" (in dBm) may represent the minimum required RX level for SUL in the cell, where Y may be predefined or broadcast in the SIB1. In some implementations, Y may be an integer. In some implementations, Y may be an integer larger than one. In some implementations, the expression "q-RxLevMin minus/plus "Y times q-RxLevMin-sul" (in dBm) may represent the minimum required RX level for the normal UL carrier in the cell.

In some implementations of the present disclosure, if the q-RxLevMin-sul is not present in the system information (e.g., SIB1, SIB2, SIB3, SIB4, SIB5), the UE may consider that the q-RxLevMin-sul and the q-RxLevMin may have the same value, and the UE may obtain the $Q_{rxlevmin}$ based on the q-RxLevMin value for SUL. In some other implementations, if the q-RxLevMin-sul is not present in the system information (e.g., SIB1, SIB2, SIB3, SIB4, SIB5), the UE may consider the SUL as being not supported, and the UE may obtain the $Q_{rxlevmin}$ based on the q-RxLevMin for the normal UL carrier. In some other implementations, if the q-RxLevMin-sul is not present in the system information (e.g., SIB1, SIB2, SIB3, SIB4, SIB5), the UE may consider the q-RxLevMin-sul value being different from the q-RxLevMin value, and the UE may request the q-RxLevMin-sul from a cell or a base station, or read the q-RxLevMin-sul in other system information (e.g., SIB2, SIB3, SIB4, SIB5) or an RRC message (e.g., RRC reconfiguration message).

In some implementations of the present disclosure, the base station or cell may transmit a minimum required received level factor (e.g., the q-RxLevMin) and an offset (e.g., the q-RxLevMin-sul in the form of an offset) via system information, where the offset may be transmitted in response to an RRC system information request message received by the base station from a UE. For example, the UE may request the q-RxLevMin-sul from a cell or a base station by sending an RRC message (e.g., RRC system information request message) or by sending a preamble associated to the request for the q-RxLevMin-sul.

In some implementations of the present disclosure, the parameters (e.g., X, Y, or q-RxLevMin-sul), which the UE may use to determine the minimum required RX level for an SUL carrier or for a normal UL carrier in the cell, may be transmitted by a cell (e.g., camped cell, serving cell) or a base station in other system information (e.g., SIB2, SIB3, SIB4, SIB5) or an RRC message (e.g., RRC reconfiguration message). In some implementations, the UE may acquire the parameters (e.g., X, Y, or q-RxLevMin-sul), which the UE may use to determine the minimum required RX level for an SUL carrier or for a normal UL carrier in the cell, from certain cell(s) (e.g., the neighboring cells).

In some implementations of the present disclosure, the specific indicator and/or the q-RxLevMin-sul may not be limited to be applied in the SIB1. For example, the specific indicator and/or the q-RxLevMin-sul may be applied to the parameters/information in other system information to reduce the size of SIBs. In some implementations, the SIBS may be transmitted by the cell or the base station via periodic broadcast, one shot broadcast, or dedicated signaling, to UE(s). In some implementations, the UE may request the SIBs on demand. In some implementations, the q-RxLevMin-sul may be transmitted by the cell or base station in the intra-frequency cell reselection information (e.g., the intraFreqCellReselectionInfo IE in the System Information Block 2 (SIB2)) to UE(s). In some implementations, the q-RxLevMin-sul may be transmitted by the cell or base station in the neighboring cell related information for intra-frequency cell reselection (e.g., the intraFreNeighCellInfo IE in the System Information Block 3 (SIB3)) to UE(s). In some implementations, the q-RxLevMin-sul may be transmitted by the cell or base station in the inter-frequency cell reselection information (e.g., the interFreqCarrierFreqInfo IE in the System Information Block 4 (SIB4)) to UE(s). In some implementations, the q-RxLevMin-sul may be transmitted by the cell or base station in the neighboring cell related information for inter-frequency cell reselection (e.g., the interFreNeighCellInfo IE in the SIB4) to UE(s). In some implementations, the q-RxLevMin-sul may be transmitted by the cell or base station in the inter-RAT cell reselection information (e.g., the CarrierFreRAT IE in the System Information Block 5 (SIB5)) to UE(s). For example, the RAT may be E-UTRA. In some implementations, the q-RxLevMin-sul may be transmitted by the cell or base station in the inter-RAT neighboring cell related information for cell reselection (e.g., the RAT-FreqNeighCellInfo IE in the SIB5) to UE(s). For example, the RAT may be E-UTRA.

In some implementations, the RAT (e.g., E-UTRA) may support the SUL carrier. If the UE acquires (or receives) the q-RxLevMin-sul in other system information (e.g., SIB2, SIB3, SIB4, and SIB5) from a cell or base station, the UE may adopt the value of the acquired q-RxLevMin-sul for intra-frequency cell (re)selection, intra-frequency cell reselection for neighboring cells, inter-frequency cell (re)selection, inter-frequency cell reselection for neighboring cells, inter-RAT cell reselection or inter-RAT neighboring cell reselection. For example, a UE camping on an E-UTRA cell may perform inter-RAT neighboring cell reselection or inter-RAT cell (re)selection to an NR cell, based on the q-RxLevMin-sul received from an E-UTRA cell. For example, a UE camping on an NR cell may perform inter-RAT neighboring cell reselection or inter-RAT cell (re)selection to an E-UTRA cell, based on the q-RxLevMin-sul received from an NR cell.

Figure 2:
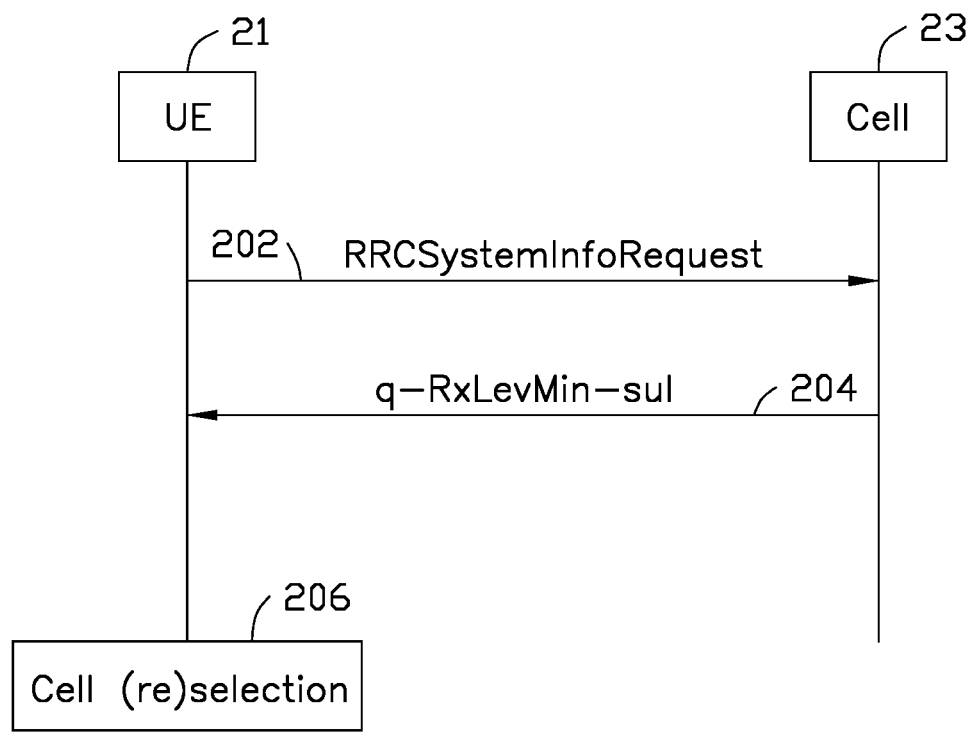
FIG. 2 is a schematic diagram illustrating a signaling flow between a UE and a cell, in accordance with example implementations of the present disclosure.

FIG. 2 is a schematic diagram illustrating a signaling flow between a UE and a cell, in accordance with example implementations of the present disclosure. As shown in FIG. 2, in action 202, a UE 21 may transmit an RRC system information request message (e.g., RRCSystemInfoRequest message) to a cell 23 (or a base station) to request the q-RxLevMin-sul.

In action 204, the UE 21 may receive the q-RxLevMin-sul from the cell 23. In action 206, the UE 21 may perform cell (re)selection (e.g., intra-frequency cell (re)selection, intra-frequency cell reselection for neighboring cells, inter-frequency cell (re)selection, inter-frequency cell reselection for neighboring cells, inter-RAT cell reselection or inter-RAT neighboring cell reselection) using the q-RxLevMin-sul value received in action 204.

In some implementations of the present disclosure, the combinations of parameter values used for cell (re)selection information (e.g., parameters in Table 1) may be defined. Taking the q-RxLevMin-sul and the q-RxLevMin as an example, the combinations of different values of the q-RxLevMin-sul and the q-RxLevMin are shown in Table 2. In Table 2, each combination of the q-RxLevMin-sul and the q-RxLevMin is indexed, and the cell may transmit the index of the candidate combination(s) to the UE via the SIB1, other system information or RRC messages using the indexed approach.

It should be noted that the combinations of the q-RxLevMin-sul and the q-RxLevMin shown in Table 2 are for illustrative purposes only, and not intended to limit the scope of the present disclosure. In some implementations, the defined combinations may be the frequent used setting by the cell and UE. In some implementations, the defined combinations may be the more reasonable combination from the system point of view. Such combinations may be pre-configured or defined in the 3GPP specification. In some other implementations, deriving the parameter/information/criterion for cell (re)selection may not be limited to the combinations of the q-RxLevMin-sul and the q-RxLevMin.

TABLE 2

Examples of combinations of cell selection related parameters

| Index | q-RxLevMin | q-RxLevMin-sul |
|---|---|---|
| 000 | −58 dBm | −70 dBm |
| 001 | −58 dBm | −64 dBm |
| 010 | −46 dBm | −70 dBm |
| 011 | −46 dBm | −64 dBm |
| 100 | −34 dBm | −70 dBm |
| 101 | −34 dBm | −64 dBm |
| 110 | −22 dBm | −70 dBm |
| 111 | −22 dBm | −64 dBm |

UE Timers and Constants

In some implementations of the present disclosure, the cell may inform the UE of the UE timers and constants for operation and maintenance. However, depending on the usage of the UE timers and constants, in some cases (e.g., considering the SIB1 size restriction), it may not be so urgent and necessary to broadcast all of the UE timers and constants in the SIB1. Thus, in some implementations of the present disclosure, some UE timers and constants may not be present in the SIB1. In some implementations, the UE timers and constants which are not present in the SIB1 may be carried by other system information (e.g., SIB2, SIB3, . . . , and so on). In some implementations, the cell may inform the UE of the UE timers and constants which are not present in the SIB1 via RRC messages (e.g., during an RRC setup procedure and/or an RRC resume procedure).

In some implementations of the present disclosure, the UE timers and constants may include at least one of (but not limited to) a first timer, a second timer, a third timer, a fourth timer, a first counter (or constant), and a second counter (or constant).

In some implementations of the present disclosure, the first timer may be or may be similar to the T300 timer in LTE or NR, but it is noted that the first timer is not necessarily limited to the T300 timer. For example, the UE may start the first timer when the UE transmits an RRC setup request message. In some implementations, the UE may stop the first timer when the UE receives an RRC setup message or an RRC reject message from the cell. In some implementations, the UE may stop the first timer when the UE performs cell reselection. In some implementations, the UE may stop the first timer when the UE aborts an RRC connection establishment procedure requested by the upper layer (e.g., the Non-Access Stratum (NAS) layer). In some implementations, when the first timer expires, the UE may perform cell reselection.

In some implementations of the present disclosure, the second timer may be or may be similar to the T301 timer in LTE or NR, but it is noted that the second timer is not necessarily limited to the T301 timer. For example, the UE may start the second timer when the UE transmits an RRC reestablishment request message. In some implementations, the UE may stop the second timer when the UE receives an RRC reestablishment message or an RRC setup message. In some implementations, the UE may stop the second timer when the UE observes that the selected cell becomes unsuitable. Upon the second timer expiry, the UE may transition to the RRC_IDLE state.

In some implementations of the present disclosure, the first counter (or constant) may be or may be similar to the N310 counter (or constant) in LTE or NR, but it is noted that the first counter (or constant) is not necessarily limited to the N310 counter (or constant). For example, the UE may maintain the first constant, which is the maximum number of consecutive "out-of-sync" indications for the Primary Cell (PCell) or the Primary Secondary Cell (PSCell) received from the lower layer. In some implementations, it is possible that one first constant for the PCell and other first constant(s) for the PSCell(s). In some implementations, it is possible that the PCell and the PSCell(s) may apply the same first constant.

In some implementations of the present disclosure, the second counter (or constant) may be or may be similar to the N311 counter (or constant) in LTE or NR, but it is noted that the second counter (or constant) is not necessarily limited to the N311 counter (or constant). For example, the UE may maintain the second constant, which is the maximum number of consecutive "in-sync" indications for the PCell or the PSCell received from the lower layer. In some implementations, it is possible that one second constant for the PCell and other second constant(s) for the PSCell(s). In some implementations, it is possible that the PCell and the PSCell(s) may apply the same second constant.

In some implementations, the third timer may be or may be similar to the T310 timer in LTE or NR, but it is noted that the third timer is not necessarily limited to the T310 timer. For example, the UE may start the third timer when the UE detects physical layer problems for the Special Cell (SpCell) (e.g., the UE receives first consecutive out-of-sync indications from the lower layers). In some implementations, the UE may stop the third timer when the UE receives second consecutive in-sync indications from the lower layers for the SpCell. In some implementations, the UE may stop the third timer when the UE receives an RRC reconfiguration message with a reconfigurationWithSync IE for that cell group. In some implementations, the UE may stop the third timer when the UE initiates the RRC connection reestablishment procedure. In some implementations, the UE may stop the third timer when the UE releases the Secondary Cell Group (SCG) if the third timer is kept in the SCG. In some implementations, if the third timer is kept in the Master Cell Group (MCG) and the security is not yet activated, the UE may transition to the RRC_IDLE state when the third timer expires. In some implementations, if the third timer is kept in the MCG and the security is activated, the UE may initiate an RRC connection reestablishment procedure upon the third timer expiry. In some implementations, if the third timer is kept in the SCG, the UE may inform E-UTRAN or NR network about the SCG radio link failure by initiating an SCG failure information procedure upon the third timer expiry. It should be noted that the PCell may refer to the primary cell of an MCG, and the PSCell may refer to the primary cell of an SCG. For dual connectivity case, the UE may be associated with one MCG and one SCG. For multi-connectivity case, the UE may be associated with one MCG and several SCGs.

In some implementations of the present disclosure, the fourth timer may be or may be similar to the T311 timer in LTE or NR, but it is noted that the fourth timer is not necessarily limited to the T311 timer. For example, the UE may start the fourth timer when the UE initiates an RRC connection re-establishment procedure. In some implementations, the UE may stop the fourth timer when the UE selects a suitable NR cell or a cell using another RAT. Upon the fourth timer expiry, the UE may transition to the RRC_IDLE state.

In some implementations of the present disclosure, the second timer or the fourth timer may not be included in the SIB1. In some implementations, the second timer or the fourth timer may be carried in RRC messages (e.g., the 4th Message (Msg4), the RRC setup message, the RRC reconfiguration message, the RRC resume message, the RRC reestablishment message, the RRC reject message, the RRC release message without suspend configuration, or the RRC release message with suspend configuration), as shown in FIG. 3.

Figure 3:
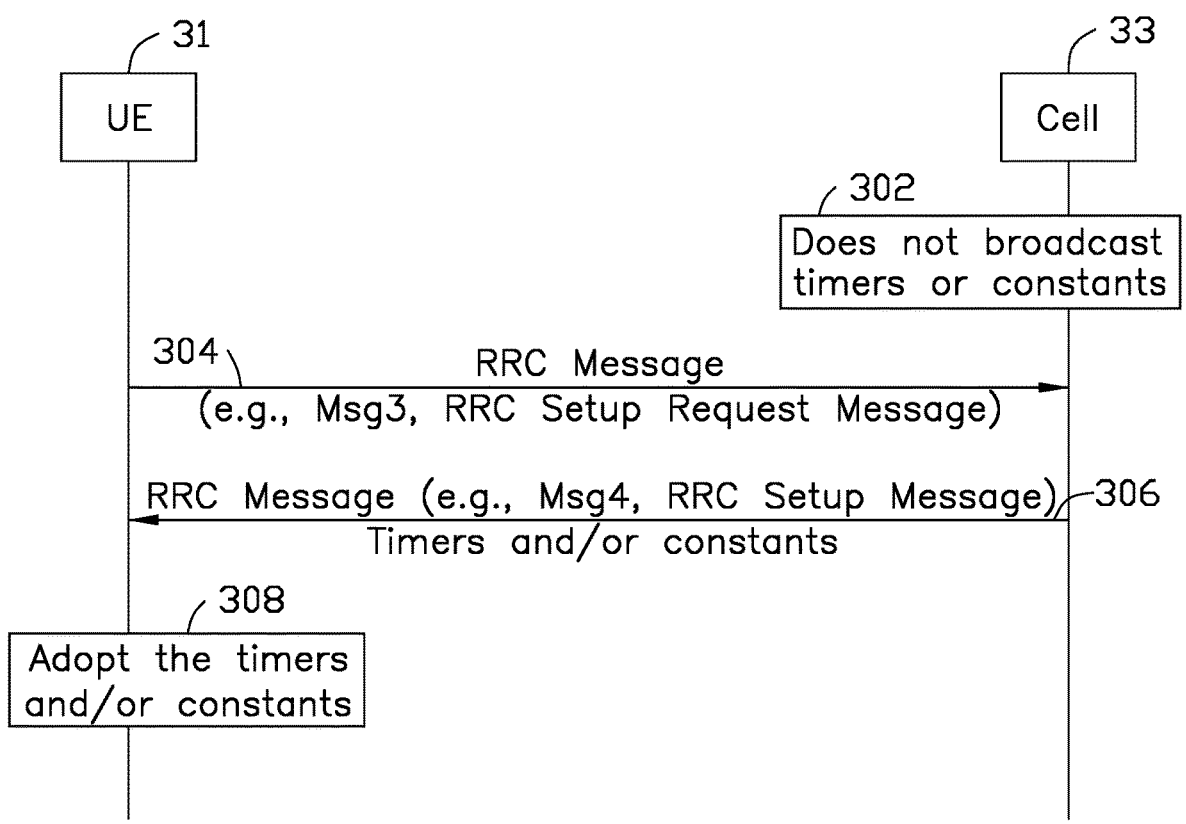
FIG. 3 is a schematic diagram illustrating a signaling flow between a UE and a cell, in accordance with example implementations of the present disclosure.

FIG. 3 is a schematic diagram illustrating a signaling flow between a UE and a cell, in accordance with example implementations of the present disclosure. As shown in FIG. 3, in action 304, a UE 31 may transmit an RRC message (e.g., the $3^{rd}$ Message (Msg3), the RRC resume request message, the RRC reestablishment request message, the RRC setup request message, the $5^{th}$ Message (Msg5), the RRC setup complete message, the RRC resume complete message, or the RRC reestablishment complete message) to a cell 33 if the cell 33 does not broadcast the UE timers or constants in action 302.

In action 306, the cell 33 may reply to the UE 31 with an RRC message (e.g., the Msg4, the RRC setup message, the RRC reconfiguration message, the RRC resume message, the RRC reestablishment message, the RRC reject message, the RRC release message without suspend configuration, or the RRC release message with suspend configuration) containing the UE timers and/or constants (e.g., the second timer and/or the fourth timer). Then in action 308, the UE 31 may adopt the UE timers and/or constants from the cell 33.

According to FIG. 3, it implies that the cell 33 may transmit a UE-specific second timer or a fourth timer to the UE 31. In some implementations, the second timer or the fourth timer may be carried in other system information. In some implementations, the UE 31 may request the other system information via a $1^{st}$ Message (Msg1)-based system information request procedure or a $3^{rd}$ Message (Msg3)-based system information request procedure to acquire the second timer or the fourth timer. The other system information may be delivered via broadcast or unicast. It should be noted that the signaling flow shown in FIG. 3 is not limited for delivering the second timer and the fourth timer by the cell. In some other implementations, if the UE does not receive the timers and/or constants from the cell, the UE may apply default value(s) to the UE timers and/or constants. In some implementations, the default value(s) may be predefined or preconfigured by the network.

In some implementations of the present disclosure, when the Msg1-based system information request procedure is applied, the Random Access (RA) preamble that the UE transmits (e.g., during Msg1 transmission in the 4-step RA procedure, or during MsgA transmission in the 2-step RA procedure) may correspond to the system information (e.g., SIB, SI message) requested by the UE. In some implementations, the Physical Random Access Channel (PRACH) occasion(s) where the UE transmits the RA preamble (e.g., during Msg1 transmission in the 4-step RA procedure, or during MsgA transmission in the 2-step RA procedure) may be associated with the system information (e.g., SIB, SI message) requested by the UE. The UE may implicitly inform the base station of the requested system information (e.g., SIB, SI message) via the RA preamble and/or the PRACH occasion(s).

In some implementations of the present disclosure, when the Msg3-based system information request procedure is applied, the Msg3 transmitted by the UE may indicate the requested system information. The UE may determine whether the Msg3-based system information request procedure is successful or not based on a reception of the Msg4. In the Msg3-based system information request procedure, the preamble(s) and/or the PRACH occasions may not be reserved in some aspects of the present implementations.

The RRC signaling may be used for the system information request (e.g., the SI request) in the Msg3-based system information request procedure. The RRC message including the SI request may be called an RRC system information request message (e.g., RRCSystemInfoRequest message). The RRC message including the SI request may be carried by Signaling Radio Bearer 0 (e.g., SRB0) from an RRC layer of the UE to a MAC layer of the UE. The SRB0 carrying the RRC message including the SI request may be carried via the Common Control Channel (CCCH), which may be configured with the Transparent Mode (TM) Radio Link Control (RLC) entity. For example, the Msg3 may include the CCCH Service Data Unit (SDU), which may include an RRC message for the SI request (e.g., the RRCSystemInfoRequest message).

In some implementations of the present disclosure, the UE timers and constants, including at least one of (but not limited to) the first timer, the second timer, the third timer, the first counter (or constant), the fourth timer, and the second counter (or constant), may be defined to have candidate combinations of values. In some implementations, the candidate combinations may be the frequent used setting by the cell and the UE. In some implementations, the candidate combinations may be the most reasonable combination from the system point of view. Such combinations may be defined in the 3GPP specification, or pre-configured by the network. In some implementations, such combinations may be indexed, as shown in (but not limited to) Table 3. The cell may transmit the index of the candidate combination(s) to the UE via the SIB1, other system information or RRC messages using the indexed approach. n1 corresponds to 1, n2 corresponds to 2, and so on.

TABLE 3

Examples of Index-based indication of UE timers and constants

| Index | Second Timer | Fourth Timer | First Constant | Second Constant |
|---|---|---|---|---|
| 000 | 100 ms | 1000 ms | n1 | n5 |
| 001 | 100 ms | 1000 ms | n1 | n10 |
| 010 | 100 ms | 1000 ms | n2 | n5 |
| 011 | 100 ms | 1000 ms | n2 | n10 |
| 100 | 200 ms | 1000 ms | n10 | n5 |
| 101 | 200 ms | 1000 ms | n10 | n10 |
| 110 | 200 ms | 1000 ms | n20 | n5 |
| 111 | 200 ms | 1000 ms | n20 | n10 |

In some implementations of the present disclosure, a SIB (e.g., the SIB1 or the MIB) may include a flag bit. If the flag bit in the SIB is set to a first value (e.g., "1"), the UE may treat this cell as camp-able cell. In some implementations, if the flag bit in the SIB is set to the first value, the UE may make an on-demand request for the corresponding SIB. In some implementations (e.g., the UE may send a preamble corresponding to the requested SIB, the UE may send an RRC message (e.g., RRC system information request message) including the system information request for the SIB), if the flag bit in the SIB is set to the first value, the UE may treat the information in the SIB as incomplete information, and make an on-demand request for the corresponding SIB. In some implementations, if the cell receives the UE's request, the cell may reply to the UE with the SIB. In some implementations, if the cell receives the UE's request, the cell may send complete information in the SIB.

In some implementations of the present disclosure, the UE may make an on-demand request for the corresponding SIB after the UE completes the RRC connection establishment procedure. In some implementations, the UE may apply default value(s) to the absent corresponding information/configuration, which the UE may receive with absent value(s). The default value may be preconfigured or predefined.

In some implementations of the present disclosure, if the flag bit in the SIB1 is set to the first value, the UE may treat this cell as a camp-able cell, and apply the default value(s) to the absent information/configuration. Once the UE completes the RRC connection establishment procedure, the UE may further on demand request for the SIBs.

In some implementations of the present disclosure, if the flag bit in the SIB is set to a second value (e.g., "0") or is absent in the SIB, it means that the UE cannot on demand request the SIB. In some implementations, if the flag bit in the SIB is set to a second value (e.g., "0") or is absent in the SIB, the UE may treat this cell as a barred cell and perform cell (re)selection. In some implementations, if at least one information field is not present in the corresponding SIB, and/or if the flag bit in the SIB is set to the second value or is absent in the SIB, the UE may consider this cell does not provide the functions supported by the absent information field, and the UE may treat this cell as a barred cell and perform cell selection.

Figure 4:
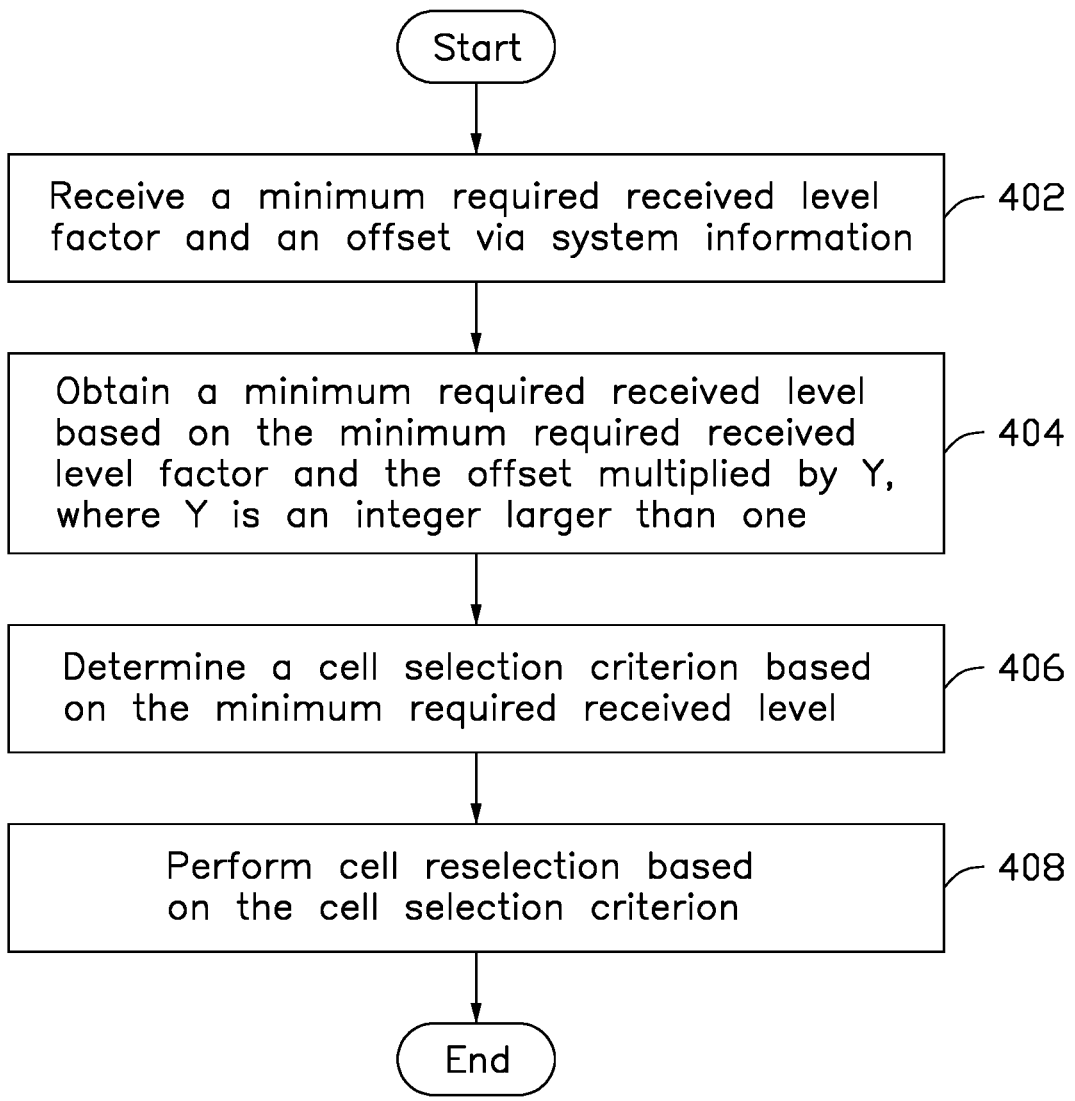
FIG. 4 shows a flowchart for a method of receiving the system information, in accordance with example implementations of the present disclosure.

FIG. 4 shows a flowchart for a method of receiving system information, in accordance with example implementations of the present disclosure. As shown in FIG. 4, the flowchart includes actions 402, 404, 406 and 408.

In action 402, a UE may receive a minimum required received level factor (e.g., the q-RxLevMin value) and an offset (e.g., the q-RxLevMin-sul value which is in the form of an offset) via system information.

In action 404, the UE may obtain a minimum required received level (e.g., the $Q_{rxlevmin}$) based on the minimum required received level factor and the offset multiplied by an integer larger than one. For example, the UE may calculate the $Q_{rxlevmin}$ based on (q-RxLevMin)±(Y×offset), wherein Y is an integer larger than one.

In action 406, the UE may determine a cell selection criterion (e.g., the cell selection criterion S) based on the minimum required received level.

In action 408, the UE may perform cell reselection based on the cell selection criterion.

In some implementations of the present disclosure, the UE may perform intra-frequency cell reselection when the offset is received in neighboring cell related information for the intra-frequency cell reselection in the SIB3 transmitted by the base station or cell.

In some other implementations, the UE may perform inter-frequency cell reselection when the offset is received in neighboring cell related information for the inter-frequency cell reselection in the SIB4 transmitted by the base station or cell.

In some implementations of the present disclosure, the UE may transmit an RRC system information request message to a cell to request the offset. In response to receiving the RRC system information request message, the cell may reply the UE with the offset via system information or RRC message(s).

Figure 5:
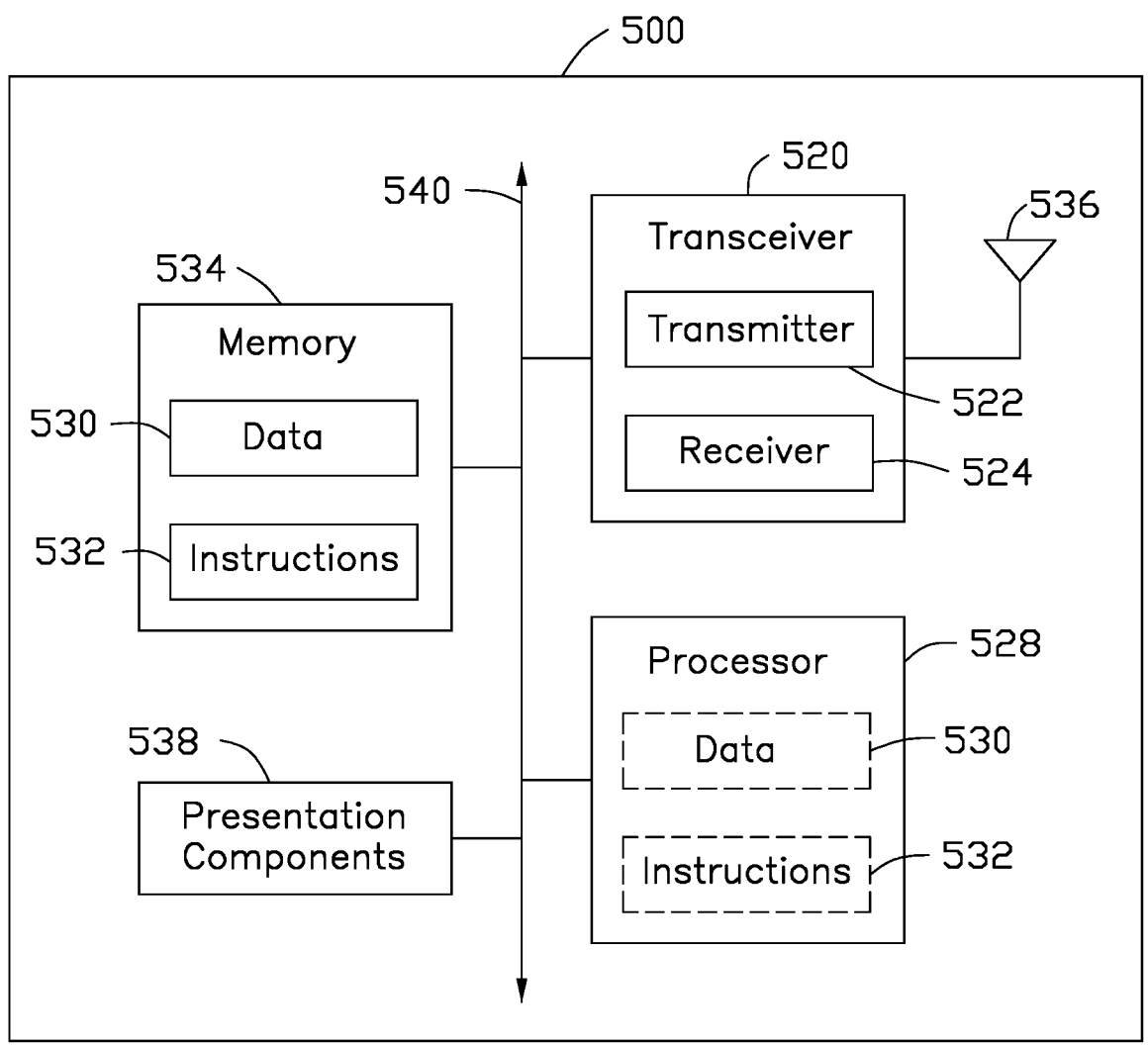
FIG. 5 is a block diagram illustrating a node for wireless communication, in accordance with various aspects of the present disclosure.

FIG. 5 is a block diagram illustrating a node for wireless communication, in accordance with various aspects of the present application. As shown in FIG. 5, a node 500 may include a transceiver 520, a processor 528, a memory 534, one or more presentation components 538, and at least one antenna 536. The node 500 may also include an RF spectrum band module, a BS communications module, a network communications module, and a system communications management module, Input/Output (I/O) ports, I/O components, and power supply (not explicitly shown in FIG. 5). Each of these components may be in communication with each other, directly or indirectly, over one or more buses 540. In one implementation, the node 500 may be a UE or a BS that performs various functions described herein, for example, with reference to FIGS. 1 through 4.

The transceiver 520 having a transmitter 522 (e.g., transmitting/transmission circuitry) and a receiver 524 (e.g., receiving/reception circuitry) may be configured to transmit and/or receive time and/or frequency resource partitioning information. In some implementations, the transceiver 520 may be configured to transmit in different types of subframes and slots including, but not limited to, usable, non-usable and flexibly usable subframes and slot formats. The transceiver 520 may be configured to receive data and control channels.

The node 500 may include a variety of computer-readable media. Computer-readable media may be any available media that may be accessed by the node 500 and include both volatile (and non-volatile) media and removable (and non-removable) media. By way of example, and not limitation, computer-readable media may comprise computer storage media and communication media. Computer storage media may include both volatile (and/or non-volatile), as well as removable (and/or non-removable) media implemented in any method or technology for storage of information such as computer-readable instructions, data structures, program modules or data.

Computer storage media includes RAM, ROM, EEPROM, flash memory or other memory technology, CD-ROM, Digital Versatile Disks (DVD) or other optical disk storage, magnetic cassettes, magnetic tape, magnetic disk storage or other magnetic storage devices. Computer storage media does not comprise a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of any of the above should also be included within the scope of computer-readable media.

The memory 534 may include computer-storage media in the form of volatile and/or non-volatile memory. The memory 534 may be removable, non-removable, or a combination thereof. Example memory includes solid-state memory, hard drives, optical-disc drives, etc. As illustrated in FIG. 5, the memory 534 may store computer-readable and computer-executable instructions 532 (e.g., software codes) that are configured to, when executed, cause the processor 528 to perform various functions described herein, for example, with reference to FIGS. 1 through 4. Alternatively, the instructions 532 may not be directly executable by the processor 528 but be configured to cause the node 500 (e.g., when compiled and executed) to perform various functions described herein.

The processor 528 (e.g., having processing circuitry) may include an intelligent hardware device, e.g., a Central Processing Unit (CPU), a microcontroller, an ASIC, etc. The processor 528 may include memory. The processor 528 may process the data 530 and the instructions 532 received from the memory 534, and information through the transceiver 520, the base band communications module, and/or the network communications module. The processor 528 may also process information to be sent to the transceiver 520 for transmission through the antenna 536, to the network communications module for transmission to a core network.

One or more presentation components 538 presents data indications to a person or other device. Examples of presentation components 538 may include a display device, speaker, printing component, vibrating component, etc.

From the above description, it is manifested that various techniques may be used for implementing the concepts described in the present application without departing from the scope of those concepts. Moreover, while the concepts have been described with specific reference to certain implementations, a person of ordinary skill in the art may recognize that changes may be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A user equipment (UE) for wireless communication, the UE comprising:
   one or more non-transitory computer-readable media storing one or more computer-executable instructions; and
   at least one processor coupled to the one or more non-transitory computer-readable media, and configured to execute the computer-executable instructions to:
   transmit a Radio Resource Control (RRC) system information request message to a cell;
   receive a minimum required received level factor and an offset via system information, the offset being included in at least one of a System Information Block 3 (SIB3) and a System Information Block 4 (SIB4);
   obtain a minimum required received level based on the minimum required received level factor and on the offset multiplied by an integer larger than one;
   determine a cell selection criterion based on the minimum required received level; and
   perform inter-frequency cell reselection according to the cell selection criterion when the offset is received in first neighboring cell related information for the inter-frequency cell reselection in the SIB4.

2. The UE of claim 1, wherein the at least one processor is further configured to execute the computer-executable instructions to:
   perform intra-frequency cell reselection when the offset is received in second neighboring cell related information for the intra-frequency cell reselection in the SIB3.

3. A base station for wireless communication, the base station comprising:
   one or more non-transitory computer-readable media storing one or more computer-executable instructions; and
   at least one processor coupled to the one or more non-transitory computer-readable media, and configured to execute the computer-executable instructions to:
   receive, from a user equipment (UE), a Radio Resource Control (RRC) system information request message;
   transmit a minimum required received level factor via system information to the UE; and
   transmit, in response to the RRC system information request message received from the UE, an offset in first neighboring cell related information for inter-frequency cell reselection in a System Information Block 4 (SIB4).

4. The base station of claim 3, wherein the at least one processor is further configured to execute the computer-executable instructions to:
   transmit the offset in second neighboring cell related information for intra-frequency cell reselection in a System Information Block 3 (SIB3).

5. A method performed by a user equipment (UE) for wireless communication, the method comprising:
   transmitting a Radio Resource Control (RRC) system information request message to a cell;
   receiving a minimum required received level factor and an offset via system information, the offset being included in at least one of a System Information Block 3 (SIB3) and a System Information Block 4 (SIB4);
   obtaining a minimum required received level based on the minimum required received level factor and on the offset multiplied by an integer larger than one;
   determining a cell selection criterion based on the minimum required received level; and
   performing inter-frequency cell reselection according to the cell selection criterion when the offset is received in first neighboring cell related information for the inter-frequency cell reselection in the SIB4.

6. The method of claim 5, further comprising:
   performing intra-frequency cell reselection when the offset is received in second neighboring cell related information for the intra-frequency cell reselection in the SIB3.

7. A method performed by a base station for wireless communication, the method comprising:
   receiving, from a user equipment (UE), a Radio Resource Control (RRC) system information request message;
   transmitting a minimum required received level factor via system information to the UE; and
   transmitting, in response to the RRC system information request message received from the UE, an offset in first neighboring cell related information for inter-frequency cell reselection in a System Information Block 4 (SIB4).

8. The method of claim 7, further comprising:
   transmitting the offset in second neighboring cell related information for intra-frequency cell reselection in a System Information Block 3 (SIB3).

* * * * *